United States Patent
Levakov et al.

(10) Patent No.: US 9,258,591 B2
(45) Date of Patent: Feb. 9, 2016

(54) VIDEO TRANSMITTING SYSTEM FOR MONITORING SIMULTANEOUS GEOGRAPHICALLY DISTRIBUTED EVENTS

(71) Applicant: OPEN JOINT STOCK COMPANY LONG-DISTANCE AND INTERNATIONAL TELECOMMUNICATIONS "ROSTELECOM" (OJSC "ROSTELECOM"), Saint-Petersburg (RU)

(72) Inventors: Andrey Kimovich Levakov, Moscow (RU); Aurika Anatolievna Savchuk, Moscow (RU); Konstantin Sergeevich Kirushev, Moscow (RU); Arina Borisovna Demina, Moscow (RU); Evgeniy Andreevich Pelymskiy, Moscow (RU); Tatyana Valentinovna Maksimenko, Ulyanovsk (RU)

(73) Assignee: OPEN JOINT STOCK COMPANY LONG-DISTANCE AND INTERNATIONAL TELECOMMUNICATIONS, Saint-Petersburg (RU)

( * ) Notice: Subject to any disclaimer, the term of this patent is extended or adjusted under 35 U.S.C. 154(b) by 0 days.

(21) Appl. No.: 14/236,514
(22) PCT Filed: Nov. 29, 2012
(86) PCT No.: PCT/RU2012/000987
§ 371 (c)(1),
(2) Date: Jan. 31, 2014
(87) PCT Pub. No.: WO2014/084750
PCT Pub. Date: Jun. 5, 2014

(65) Prior Publication Data
US 2015/0326902 A1 Nov. 12, 2015

(51) Int. Cl.
*H04N 7/173* (2011.01)
*H04N 21/2665* (2011.01)
*H04N 21/2343* (2011.01)
*H04N 21/218* (2011.01)
(Continued)

(52) U.S. Cl.
CPC ....... *H04N 21/2665* (2013.01); *H04N 7/17309* (2013.01); *H04N 21/2181* (2013.01);
(Continued)

(58) Field of Classification Search
CPC .................................................. H04N 7/173
USPC .......................... 725/112, 25, 40, 51, 86, 113
See application file for complete search history.

(56) References Cited

U.S. PATENT DOCUMENTS

| 2004/0068743 A1 | 4/2004 | Parry et al. |
| 2010/0259595 A1 | 10/2010 | Trimeche et al. |

FOREIGN PATENT DOCUMENTS

| RU | 2 442 217 C1 | 1/2001 |
| RU | 2009 137 130 A | 4/2011 |
| WO | WO 2008/107686 A2 | 9/2008 |

OTHER PUBLICATIONS

International Search Report mailed Aug. 8, 2013 (PCT/ISA/210, PCT/ISA/220, PCT/ISA,237) for PCT RU2012/000987.

*Primary Examiner* — Kieu Oanh T Bui
(74) *Attorney, Agent, or Firm* — Birch, Stewart, Kolasch & Birch, LLP

(57) ABSTRACT

A video transmitting system including a plurality of video cameras, a plurality of video monitoring apparatuses, a plurality of local storage devices, a data transmission subsystem, at least one video data collecting and transmitting apparatus, at least one collecting storage device, and at least one interface apparatus is presented. Video data from the video cameras are stored in the local storage devices and transmitted through the data transmission subsystem to be stored in the collecting storage device and to be transmitted to users.

12 Claims, 1 Drawing Sheet

(51) Int. Cl.
 H04N 21/414 (2011.01)
 H04N 21/431 (2011.01)
 H04N 21/4223 (2011.01)
 H04N 21/8352 (2011.01)

(52) U.S. Cl.
 CPC ..... *H04N21/21805* (2013.01); *H04N 21/2343* (2013.01); *H04N 21/41407* (2013.01); *H04N 21/4223* (2013.01); *H04N 21/4316* (2013.01); *H04N 21/8352* (2013.01)

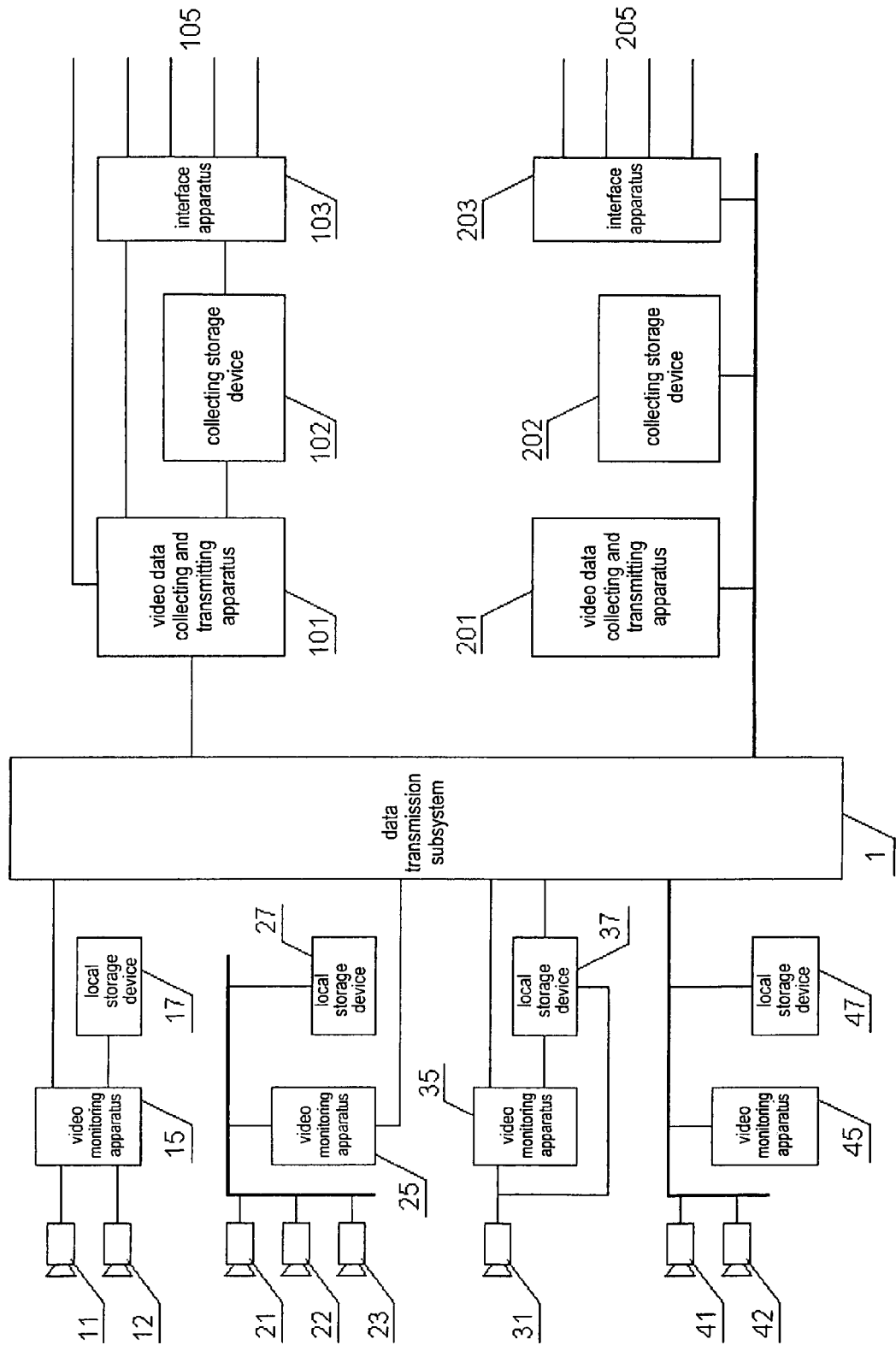

VIDEO TRANSMITTING SYSTEM FOR MONITORING SIMULTANEOUS GEOGRAPHICALLY DISTRIBUTED EVENTS

FIELD OF THE INVENTION

The present invention relates to a system of apparatuses to capture and transmit video images, particularly, to video monitoring and broadcasting systems able to capture video data at a plurality of monitoring locations and transmit them to a plurality of observers.

BACKGROUND OF THE INVENTION

The International Patent Application WO2008107686 discloses a system arranged to display upon request video imagery together with audio signal and comprising a plurality of cameras able to capture video images, a video monitoring apparatus comprising a video compression module adapted to compress video images received from the cameras, a video archiving programming module arranged to process video signals compressed by the compression module, a video archiving storage device arranged to store the said compressed video signals, a secondary video compression module linked to the storage device and adapted to compress video imagery received from the said storage device into a format selected from a mobile device format, a web video format and a TV video format, a video data transmitting apparatus (server) adapted to the said format and arranged to interrogate the said storage device and capable of communication with a remote mobile device, a web browser or a TV display controller and with a gateway payment appropriate to the said format, and wherein archived video images are compressed and relayed to the said server and subsequently to the said mobile device, web browser or TV display controller upon demand from the said server when triggered by a request from any of the said remote mobile device, the web browser or the TV display controller for specific video imagery once authorized by said payment means.

This video transmitting system enables the data to be captured and transmitted from several video cameras installed at location where the event would take place, for example, at a stadium or in a concert hall, to a plurality of users. At the same time, in case the system operates at a plurality of locations arranged for simultaneous video monitored events at a significant distance from each other, for example, one kilometer to several thousand kilometers apart, the said system cannot be used or requires significant material or financial costs due to the fact that if such events take place in different towns or different districts of a town, there is required a high capacity dedicated data transmission channel to transmit the video image data to the storage device, because the amount of the video image data both compressed and uncompressed is large. To provide the high capacity dedicated data transmission channel for transmission of the large amount of the data, there is required some high performance equipment to be installed or rented, which leads to significant financial costs.

Another limiting factor in the usage of the video transmitting system for simultaneous video monitoring events at the plurality of locations disclosed in WO2008107686 is that being transmitted from video cameras installed at different locations, the data on the video images may be lost due to, for example, the camera failure, a data transmission channel break or the interference that causes video image deterioration on receiving the data. The data transmission channel of sufficient capacity cannot be always provided for an entire time period of video data transmission, if the locations where the monitoring video cameras are installed are geographically broadly distributed. When an event at one location, for example, a concert or a sport match, is being video broadcast, in case a signal from one camera being lost or deteriorated, the transmitted video image may be replaced with the image from another video camera installed at the same event location. However, if there being video monitored some geographically separated events such as government or municipal elections, a signal from one camera cannot be always replaced with an image from another camera, because of some difficulties associated with preparing and maintaining the data transmission channel from each location for video capturing there may be installed either only one camera or few ones with each of the cameras transmitting images of different sectors and objects of and at, for example, a polling station in case of video broadcasting aimed at monitoring government or municipal elections.

If a video record from the same video camera is serially requested to be viewed by a plurality of users, the data transmission subsystem of the video transmitting system of WO2008107686 is subjected to an increased load, because the video record stored in the storage device for video record archiving is required to be transmitted several times (according to a number of request sent by the users to the server) in order to be transmitted from the server to the mobile devices, web-browsers or controllers of TV devices of users. The technical solution of the International Patent Application WO2008107686 supposes that the storage device is installed close by or inside the video monitoring apparatus and transmits the video data to the server through the data transmission subsystem, for example, the Internet. If the storage device was installed close by the server or was a part of the server, the load of the data transmission subsystem would be decreased, but in that case the risk to lose the video data from the video cameras and the video monitoring apparatus would increase, because in that case they are required to be transmitted through the data transmission subsystem, which or interface devices of which may failure or have insufficient data transmission rates.

SUMMARY OF THE INVENTION

An object of the present invention is to provide a video monitoring apparatus and a system providing monitoring of a plurality of simultaneously on-going events at geographically broadly distributed locations, i.e. those may take place at significant distances from each other, several kilometers to thousands and tens of thousands kilometers or more apart. Another object of the present invention is to reduce load on a data transmission subsystem (reduce an amount of transmitted data) simultaneously with the decrease of a risk to lose the video data. An additional object of the present invention is to provide with identification of the images and following selection of the video data to be viewed in accordance with the arrangement of the video monitoring apparatuses and/or video cameras.

The object of the present invention may be solved by a video transmitting system including a plurality of video cameras, a plurality of video monitoring apparatuses, a plurality of local storage devices, a data transmission subsystem, at least one video data collecting and transmitting apparatus, at least one collecting storage device, and at least one interface apparatus.

The video transmitting system includes the video cameras arranged to transmit the video data to the local storage devices directly or through the video monitoring apparatuses, wherein the local storage devices are arranged to store at least a part of the video data received from the video cameras directly or through the video monitoring apparatuses. Further, the data transmission subsystem is arranged to receive at least a part of the video data from the video monitoring apparatuses and/or the local storage devices directly or through the video monitoring apparatuses and to transmit at least a part of the video data to the collecting storage device and/or the interface apparatus directly or through the video data collecting and transmitting apparatus, wherein the collecting storage device is arranged to store at least a part of the video data received from the data transmission subsystem directly or through the video data collecting and transmitting apparatus.

According to the invention, the interface apparatus is arranged to enable at least one user to specify a video camera and/or a video monitoring apparatus and/or a local storage device to view video data from them, and/or video data required to be viewed. Further, the video data collecting and transmitting apparatus and/or the interface apparatus are arranged to receive at least a part of the video data specified by the user from the data transmission subsystem and/or the collecting storage device and to transmit at least a part of the video data specified by the user to the user.

In a preferable embodiment the video monitoring apparatuses are arranged to receive at least a part of the video data from the video cameras and/or the local storage devices and to transmit at least a part of the video data to the data transmission subsystem at least a part of the video data.

The video data collecting and transmitting apparatus may be arranged to receive at least a part of the video data specified by the user from the data transmission subsystem and/or the collecting storage device and to transmit at least a part of the video data specified by the user to the user directly or through the interface apparatus.

The video cameras and/or the video monitoring apparatuses advantageously are arranged to assign identification information of the video monitoring apparatus and/or the video camera and/or the local storage device to at least a part of the video data, wherein the video monitoring apparatuses are arranged to transmit at least a part of the video data jointly with the identification information of the video monitoring apparatus and/or the video camera and/or the local storage device.

In a preferable embodiment of the invention the video monitoring apparatuses and/or the video data collecting and transmitting apparatus are arranged to perform processing of the video data, wherein the video data processing is compression and/or encoding and/or format conversion and/or allocation of a part of the video data to be transmitted.

To solve the object of the present invention a video monitoring apparatus used in a video transmitting system including video cameras, local storage devices, a data transmission subsystem, at least one video data collecting and transmitting apparatus, at least one collecting storage device, and at least one interface apparatus is presented. The video monitoring apparatus is connectable to at least one video camera, at least one local storage device, and the data transmission subsystem. According to the invention, the video monitoring apparatus is arranged to receive video data from the video camera and to store at least a part of the video data received from the video camera in the local storage device and/or arranged to receive the video data from the local storage device, and is arranged to transmit at least a part of the video data received from the video camera and/or the local storage device to the data transmission subsystem to transmit them to the video data collecting and transmitting apparatus and/or the collecting storage device and/or the interface apparatus.

In an advantageous embodiment the video monitoring apparatus is arranged to assign identification information of the video monitoring apparatus and/or the video camera and/or the local storage device to at least a part of the video data, wherein the video monitoring apparatus is arranged to transmit at least a part of the video data jointly with the identification information of the video monitoring apparatus and/or the video camera and/or the local storage device.

The video monitoring apparatus may be arranged to perform processing of the video data, wherein the video data processing is compression and/or encoding and/or format conversion and/or allocation of a part of the video data to be transmitted. In a preferable embodiment the video monitoring apparatus of the invention is arranged to compress the video data and to transmit at least a part of the compressed video data to the local storage device and/or the data transmission subsystem.

To solve the object of the present invention a video data collecting and transmitting apparatus used in a video transmitting system including video cameras, video monitoring apparatuses, local storage devices, a data transmission subsystem, at least one collecting storage device, and at least one interface apparatus is aimed as well, wherein the video data collecting and transmitting apparatus is arranged to collect and transmit video data from the plurality of the video cameras and/or the video monitoring apparatuses and/or the local storage devices installed at geographically distributed locations. The video data collecting and transmitting apparatus in such a video transmitting system is connectable to the data transmission subsystem, the collecting storage device, and the interface apparatus.

According to the invention, the video data collecting and transmitting apparatus is arranged to receive the video data from the data transmission subsystem and to store at least a part of the received video data in at least one collecting storage device. The video data come to the data transmission subsystem from the video cameras and/or the video monitoring apparatuses and/or local storage devices, accordingly.

Moreover, the video data collecting and transmitting apparatus is arranged to receive information on a specified by a user video camera and/or a video monitoring apparatus and/or a local storage device, to view video data from them and/or video data specified by the user and required to be viewed from the interface apparatus and arranged to receive at least a part of the specified video data from the data transmission subsystem and/or the collecting storage device and to transmit at least a part of the specified video data to the user directly or through the interface apparatus.

The video data collecting and transmitting apparatus is preferably arranged to perform processing of the video data, wherein the video data processing is compression and/or encoding and/or format conversion and/or allocation of a part of the video data to be transmitted.

The object of the present invention is also solved by an interface apparatus of a video transmitting system including video cameras, video monitoring apparatuses, local storage devices, a data transmission subsystem, at least one video data collecting and transmitting apparatus, and at least one collecting storage device. The said interface apparatus is connectable to the data transmission subsystem and/or the video data collecting and transmitting apparatus and/or the collecting storage device.

The interface apparatus according to the present invention is arranged to enable at least one user to specify a video camera and/or a video monitoring apparatus and/or a local storage device to view video data from them, and/or video data required to be viewed. The information on the video camera and/or the video monitoring apparatus and/or the local storage device to view video data from them, and/or video data required to be viewed specified by the user may be further transmitted to the video data collecting and transmitting apparatus and/or the collecting storage device. Further, the interface apparatus is arranged to receive at least a part of the specified video data from the data transmission subsystem and/or the video data collecting and transmitting apparatus and/or the collecting storage device and to transmit at least a part of the specified video data to the user.

A technical result of the present invention is enabling monitoring a plurality of events simultaneously going on at geographically broadly distributed locations with the use of the presented system. Due to the use of the plurality of the video monitoring apparatuses and the collecting storage device, the load on the data transmission subsystem is reduced and the use of the plurality of the local storage devices enables decrease of the risk to lose the video data and improvement of reliability of the video transmitting system. An additional technical result is ensuring the availability of the entire video data in the collecting storage device, which were captured by the video cameras and stored in the local storage devices but were not transmitted to or not received by the video data collecting and transmitting apparatus and not stored in the collecting storage device. Moreover, identification of the images and the following selection of the video data to be viewed in accordance with the arrangement of the video monitoring apparatuses and/or the video cameras are provided.

BRIEF DESCRIPTION OF THE DRAWING

FIG. 1 shows an example of a video transmitting system illustrating several embodiments of the present invention.

DETAILED DESCRIPTION OF THE EMBODIMENTS

The video transmitting system according to the present invention is shown in FIG. 1 and includes a plurality of video cameras 11,12,21-23,31,41,42, a plurality of video monitoring apparatuses 15,25,35,45, a plurality of local storage devices 17,27,37,47, a data transmission subsystem 1, two video data collecting and transmitting apparatuses 101,201, two collecting storage device 102,202, and interface apparatuses 103,203, which may have connections 105,205 with a plurality of users, accordingly. Some embodiments of the video transmitting system according to the present invention may employ only one video data collecting and transmitting apparatus, one collecting storage device and one interface apparatus.

The video cameras are arranged to transmit video data to the video monitoring apparatuses and may be digital or analogous. Signals of the analogous cameras are digitized by analog-to-digital converters (ADC) prior to input to the video monitoring apparatuses. The system preferably includes capturing modules arranged to capture video signals of CCD (Charge Coupled Device) or CMOS (Complementary Metal Oxide Semiconductor) sensors of the video cameras and to generate a stream of video data of a conventional format or a format purposely designed for this system. The capturing modules (which may include ADC) may be accommodated in the video cameras or the video monitoring apparatuses.

One video monitoring apparatus may be connected with one or several video cameras. The connection may be wired or at least partly wireless. In the case of the wired connection the video camera may be connected to the video monitoring apparatus directly or this connection may pass through a splitter. The connection may be realized with the use of a common data bus as well. The preferable embodiment of the present invention uses webcams available at the present time. Webcams are usually relatively small-sized items including an optical element and an image sensor for conversion of an image to an electrical signal and the video image signal is further digitized and transmitted to a computer with the use of, for example, USB (Universal Serial Bus).

Available webcams enable capturing audio data along with the images of the video data, wherein the audio data represents sounds sensed by a microphone built-in a webcam and converted to an electrical digital signal. Although the present specification describes processing, transmission and storing of the video data, those skilled in the art may understand that the audio data may be transmitted jointly, concurrently or additionally to the said video data. Since an amount of audio data transmitted within a given time interval is a small part of transmitted video data, the audio data may be further assumed as being transmitted simultaneously with the video data, though the video data may be transmitted without the audio data. The audio data may be captured by not the microphone built-in the webcam but by a separate microphone and abovementioned relates to such audio data as well. The specification describes transmission of the video data and the audio data, which may be transmitted as fragments (for example, files or pieces) or as a stream of the video data and the audio data, accordingly. A part of the video data and/or the audio data may be removed from the video data to be transmitted; for example, separate frames or frame sequences may be removed (removed data are preferably transmitted later).

According to the present invention, the video monitoring apparatus have to be connectable to the video camera, if it is external one, or to have a built-in video camera, and have to be connectable to the data transmission subsystem to be enabled to receive and transmit data. The said connections may be wired or wireless. Accordingly, the video monitoring apparatuses are arranged to receive the video data from the video cameras and in order to ensure this they should enable the said video cameras to be connected to them and should be provided with appropriate hardware and software. For example, in the case the said webcams are used, the video monitoring apparatus should be provided with one or more USB ports as well as software enabling the receipt of the said video data. There is one or more video monitoring apparatuses to be installed at each of the geographically distributed locations depending on the requirements for video monitoring coverage of the locations. The terms "to receive", "received", or "receipt" used in the specification and the claims may be replaced with the terms "to obtain", "obtained", or "obtaining", accordingly.

There is preferably at least one video monitoring apparatus to be installed at each location and one or several video cameras and one or several storage devices to be connected to the said video monitoring apparatus. The video monitoring apparatuses according to the invention are arranged to receive the video data from the video cameras and arranged to transmit at least a part of the video data received from the video cameras to the local storage devices. The video monitoring apparatuses may include the following modules carried out as hardware, software of firmware: data processing modules arranged to perform processing of the video data received from the video cameras and/or the local storage devices, and data transmission modules arranged to transmit at least a part of the video data to, for example, the video data collecting and transmitting apparatus through the data transmission subsystem.

The data processing modules may be realized in various ways known from the state of the art and they are preferably carried out on the base of processors executing operations in accordance with a program. At the same time the data processing modules may be implemented as video cards, the video cards may be designed built-in or plugged-in for video data processing. The processing of the video data may be compression and/or encoding and/or format conversion of the video data. Determination of video data to be transmitted in the case of transmission of a part of the video data, assigning the video data with the identification information, sending the video data to the storage devices and the data transmission modules relate to the video data processing as well.

The data transmission modules are preferably network cards interfacing between the video monitoring apparatuses and the data transmission subsystem. The network cards may be built-in or plugged-in, for example, through USB.

Some modules of the video monitoring apparatus or entire video monitoring apparatus may be disposed in the video camera and/or the local storage device, for example, accommodated within their bodies. In turn, some components of the video cameras and/or the local storage devices may be disposed in the video monitoring apparatuses, for example, accommodated within their bodies. The video monitoring apparatuses may be installed in limited access places.

The local storage devices arranged to receive and to store at least a part of the video data from the data processing modules and/or the video cameras play an important role. The local storage devices preferably are parts of the video monitoring apparatuses or they may be external storage devices connected to the video monitoring apparatuses and installed, for example, at the same locations where the video monitoring apparatuses installed or in remote places. The local storage devices may be installed in limited access places. In some embodiments the local storage devices may be directly connected with the video cameras and/or the data transmission subsystem to enable direct data receipt/transmission. The local storage devices may be realized in various ways—they may be hard disks, nonvolatile memory, random access memory, optical recording devices, memory cards and other storage devices known in the state of the art and available in the market. The important parameters to be provided by the utilized storage devices are storage capacity and a data storage rate. The storage capacity is to be sufficient to store all data (audio data as well) received over a whole period of the monitored event or a part of the video data to be transmitted later. The data storage rate is to be sufficient for lossless storing of all incoming data. If the storage capacity or the data storage rate of one or several storage devices is not sufficient, additional storage devices may be used to provide the required parameters. If the video data are simultaneously stored in the local storage device and transmitted through the data transmission subsystem to the video data collecting and transmitting apparatus, the collecting storage device, and/or the interface apparatus, there should be provided the corresponding video data storage rates along with the sufficient video data transmission rates.

The local storage devices advantageously store all video data incoming from the video cameras and preferably processed by the video monitoring apparatuses in order to reduce a risk to lose them, for example, during transmission of them to the video data collecting and transmitting apparatus, and to ensure availability of the most comprehensive records of the video data in the video data collecting and transmitting apparatus and/or the collecting storage device. It is necessary because there might be a situation when the data transmission subsystem may not ensure a data transmission rate or a quality of a channel transmitting medium required for direct storing of the data in the video data collecting and transmitting apparatus (or the collecting storage device connected to the video data collecting and transmitting apparatus) or a situation when the video data collecting and transmitting apparatus itself cannot receive all data from the plurality of the video monitoring apparatuses—in this case a part of the data transmittable by the data transmission subsystem and receivable by the video data collecting and transmitting apparatus is transmitted while the data not transmitted and having stored in the local storage device are transmitted later. Partial transmission of the video data may be carried out on the base of dividing the recorded in the storage device or directly received from the video cameras video data into time intervals or with the reduce of the frame rate. When a data transmission channel is broken, i.e. when there is no opportunity to transmit data through the data transmission subsystem, the local storage device ensures information preservation for subsequent transmission as well. At the same time the local storage devices may track a data transmission subsystem state and the accessibility of the collecting storage device, and if the data transmission channel is restored, they may continue transmitting the data to the collecting storage device. The local storage devices may be arranged to transmit the stored video data to the video monitoring apparatus, the video data collecting and transmitting apparatus, or some other storage devices being a part of, for example, the data transmission subsystem or separate storage devices.

The data transmission subsystem according to the present invention is arranged to receive at least a part of the video data from the plurality of the video monitoring apparatuses and to transmit at least a part of the video data to the video data collecting and transmitting apparatus. The data transmission subsystem may be represented by optical, satellite, and/or radio communications and may be realized as a data transmission network, for example, a local area network or the Internet. The said kinds of the communicating means may be combined, wherein the data transmission channels may be connected to each other or be independent, while preferably the existing data transmission channels are used. Parts of the data transmission subsystem may be used to transmit the video data from all or a part of the video monitoring apparatuses. Preferably the data transmission subsystem ensures the sufficient transmission rates to transmit the data from the video cameras, the video monitoring apparatuses, and/or the local storage devices to the video data collecting and transmitting apparatus, the collecting storage device, and/or the interface apparatus.

The video data collecting and transmitting apparatus or a plurality of these apparatuses is connected to the data transmission subsystem and is arranged to receive the video data from the video monitoring apparatuses through the data transmission subsystem. In some embodiments the video data collecting and transmitting apparatus may receive the video data directly from the video cameras and/or the local storage devices. To store the data, the video data collecting and transmitting apparatus contains as a part or connected to the collecting storage device arranged to store the said data. Accordingly, the video data collecting and transmitting apparatus is arranged to store at least a part of the received video data in the collecting storage device. The video data stored in the collecting storage device may be further retrieved and viewed. The collecting storage device may be realized with the use of the same types of the storage devices mentioned with relation to the local storage devices; however their capacity and/or data storage rates are to be greater according to the increased amount of the simultaneously stored data.

The interface apparatus is arranged to enable at least one user to specify the video camera and/or the video monitoring apparatus, i.e. one required source of the video data to be viewed among several sources, and preferably to ensure transmission of the information on the specified by the user video camera and/or video monitoring apparatus and/or video data required to be viewed to the video data collecting and transmitting apparatus and/or the collecting storage device. For this purpose the interface apparatus may enable the user to select the video camera and/or the video monitoring apparatus providing the video data desired by the user to be viewed among the plurality of the video cameras and/or the video monitoring apparatuses. In another embodiment the interface apparatus may enable the user to specify the identification information of the video camera and/or the video monitoring apparatus for the same purpose.

In one of the embodiments the interface apparatus may be arranged to receive the video data, which are received from the specified by user video camera and/or video monitoring apparatus, from the data transmission subsystem and/or the video data collecting and transmitting apparatus and/or the collecting storage device, wherein the interface apparatus may be arranged to transmit the video data received from the data transmission subsystem and/or video data collecting and transmitting apparatus and/or collecting storage device to the user.

The video data collecting and transmitting apparatus may be implemented as an integrated apparatus or consist of several units or modules. In some embodiments the video data collecting and transmitting apparatus and the interface apparatus may be combined or realized as a consolidated apparatus.

To provide the video data collecting and transmitting apparatus and/or the collecting storage device with entire video data captured by the video cameras and stored by the local storage devices but not received by the video data collecting and transmitting apparatus and/or not stored by the collecting storage device for some reasons, the video monitoring apparatus may be provided with information on receipt/non-receipt and/or presence/absence of at least a part of the video data in the collecting storage device. In this case the video monitoring apparatuses are additionally arranged to receive at least a part of the video data not received by the video data collecting and transmitting apparatus from the local storage devices and to transmit the video data to the video data collecting and transmitting apparatus through the data transmission subsystem. The information on receipt/non-receipt and/or presence/absence of at least a part of the video data may be transmitted to the plurality of the video monitoring apparatuses through the data transmission subsystem or, instead of it or in addition to it, through another data transmission channel. To ensure the availability of entire video data in the collecting storage device, the required video data may be transmitted from the local storage device to the collecting storage device through the data transmission subsystem or in another way. The data may be transmitted as a whole record (over the entire time interval of the video monitoring) or a record over the required time interval. This transmission may be optional or regular and may be carried out, for example, for all or a part of the plurality of the local storage devices.

To enable the identification of the images and subsequent selection of the video data to be viewed in accordance with the arrangement of the video monitoring apparatuses and/or the video cameras, the data processing modules of the video monitoring apparatuses and/or the video cameras may be arranged to assign the identification information of the video monitoring apparatuses and/or video cameras to at least a part of the video data, wherein the data transmission modules may be arranged to transmit at least a part of the video data jointly with the identification information of the video monitoring apparatuses and/or video cameras, and the data transmission subsystem may be arranged to receive from the plurality of the video monitoring apparatuses and to transmit to the video data collecting and transmitting apparatus of at least a part of the video data jointly with the identification information of the video monitoring apparatuses and/or the video cameras. The identification information of the video monitoring apparatuses and/or the video cameras may be predetermined, for example, by the video data collecting and transmitting apparatus or defined within a given range. In another embodiment the identification information may be a part of the video data and assignment and transmission of such information jointly with the video data are not required. The identification information may be not required as well, if the video data are transmitted through dedicated resources, for example, a dedicated data transmission channel or a dedicated resource in a case of the use of time division, frequency division, or code division of signals, because in this case one-to-one correspondence of the video data and the video camera and/or the video monitoring apparatus may be determined and the identification information may be assigned, for example, by the video data collecting and transmitting apparatus.

To reduce the amount of the video data transmitted through the data transmission subsystem and stored in the local storage devices or the collecting storage device, the video data may be compressed, wherein the data transmission modules may be arranged to transmit at least a part of the video data in the compressed format to the video data collecting and transmitting apparatus through the data transmission subsystem, wherein the local storage devices may be arranged to receive from the data processing modules and/or the video cameras and to store at least a part of the video data in the compressed format, wherein the data transmission subsystem may be arranged to receive from the plurality of the video monitoring apparatuses and to transmit to the video data collecting and transmitting apparatus at least a part of the video data in the compressed format, and the video data collecting and transmitting apparatus may be arranged to receive and to store at least a part of the video data in the compressed format.

The video transmitting system according to the present invention preferably contains not less than 10 video monitoring apparatuses and may contain 50 and more these apparatuses depending on use conditions. For example, if the system is used to monitor regional elections, it may employ not less than 100-200 video monitoring apparatuses, whereas if the system is used to monitor elections held throughout a country, it may employ more than 1000 or several thousands of these apparatus depending on a number of polling stations. Accordingly, a number of the video cameras and the amount of the stored video data depend on a kind of the monitored event. One, five or ten (or more) video cameras may be connected to one video monitoring apparatus. Note that simultaneous events are widely geographically distributed, i.e. distances between them may have values from several kilometers to several ten thousands kilometers, and use of the plurality of the video monitoring apparatuses realized with use of personal computers enables receipt of the video data by the video data collecting and transmitting apparatus, and use of the data transmission subsystem separated from the video monitoring apparatuses reduces data transmission costs and increases general reliability of the system due to dividing the system to subsystems, blocks, modules.

Various configurations of the video transmitting system are described below. The video transmitting system according to the first embodiment is illustrated in FIG. 1 with the use of the video cameras 11,12, the video monitoring apparatus 15, the local storage device 17, the data transmission subsystem 1, the video data collecting and transmitting apparatus 101, the collecting storage device 102, and the interface apparatus 103 and operates as follows. Two video cameras 11,12 capture pictures (preferably jointly with the accompanying sound) and transmit them to the video monitoring apparatus 15 as electrical signals. The video monitoring apparatus 15 receives these video data and forwards them to the local storage device 17 connected to it and transmits them through the data transmission subsystem 1 to the video data collecting and transmitting apparatus 101. The video data collecting and transmitting apparatus 101 receives the video data transmitted by the plurality of the video monitoring apparatuses (including the video monitoring apparatus 15) and stores them in the collecting storage device 102. Concurrently, the user with use of the interface apparatus 103 selects any video camera to view video data of this video camera, for example, the video camera 12 connected to the video monitoring apparatus 15 and in accordance to the instruction received from the interface apparatus 103 the video data collecting and transmitting apparatus 101 sends video data captured by the video camera 12 and received from the video monitoring apparatus 15 connected with the video camera 12 to the user (for example, to a web-browser of the user). Transmission of the video data from the video camera 12 is performed in a real-time mode and these video data are concurrently stored in the collecting storage device 102. The video data may be transmitted to the user through the interface apparatus 103 and one of the data transmission channels 105 or directly to the user through a channel from the video data collecting and transmitting apparatus 101 (FIG. 1 shows such a channel above the channels 105). If the user wants to view the video data, for example, from the same video camera 12 but captured earlier, i.e. the video data over earlier time period, in this case the video data collecting and transmitting apparatus 101 in accordance with the instruction of the interface apparatus may address to the collecting storage device 102 to retrieve the specified video data received earlier from the video monitoring apparatus 15 connected with the specified video camera 12 and stored in the collecting storage device 102 for subsequent forwarding them to the user to be viewed.

In the second embodiment, the interface apparatus 103 may directly address to the collecting storage device 102 to retrieve specified video data from it (FIG. 1 shows a connection between them). Thus, besides viewing the video data over distant past time periods, it is possible to view current video data received from the video monitoring apparatus and the video cameras and stored in the collecting storage device in a way close to the real-time mode, because any time delay of the video data may have insignificant value imperceptible or uncritical for the user depending on performance of the collecting storage device.

In the third embodiment of the invention, the video camera may input its video signal not only to the video monitoring apparatus, but to the local storage device as well, as it is shown by the video camera 31 and the local storage device 37 in FIG. 1. Along with the fact that only one video camera 31 is connected to the video monitoring apparatus 35 and it transmits the video data to the storage device 37 in addition to the apparatus 35 as well, the data transmission subsystem 1 may receive the video data to transmit to the video data collecting and transmitting apparatus not only from the apparatus 35, but from the local storage device 37 as well. This may be used, for example, for transmission of the video data in a way close to the real-time mode—depending on performance of the local storage device, a time delay of the video data may have insignificant value and the data will be transmitted practically without significant lags. A transmission of the video data over a relatively long time interval may be carried out in the same way.

The fourth embodiment of the present invention is illustrated in FIG. 1 by three video cameras 21,22,23, the video monitoring apparatus 25, the local storage device 27, the data transmission subsystem 1, the video data collecting and transmitting apparatus 101, the collecting storage device 102, and the interface apparatus 103. This embodiment of the invention differs from other ones in that, as shown in FIG. 1, the video cameras 21,22,23, the video monitoring apparatus 25, and the local storage device 27 are connected by a common data bus and the data transmission subsystem 1 is connected with the video monitoring apparatus 25 by a separate connection. As a result of this arrangement, the video data from the video cameras may simultaneously come to the video monitoring apparatus and the local storage device. With this configuration the video monitoring apparatus 25 may control the input of the video data to the data transmission subsystem.

As shown in FIG. 1, the video cameras 41,42 may be connected with the data transmission subsystem 1, the video monitoring apparatus 45 and the local storage device 47 by a common data bus (in some embodiments not shown by FIGURE, the local storage device 47 may be connected with the video monitoring apparatus 45 only). In this case the video data from the video cameras 41,42 may be directly transmitted to the video data collecting and transmitting apparatus 101 or 201 with use of the data transmission subsystem 1. In a case a video data collecting and transmitting apparatus is connected with the data transmission subsystem 1 and an interface apparatus, as shown with regard to the apparatus 201 and 203 in FIG. 1, the video data from the video camera 41,42 may be transmitted through the data transmission subsystem 1 and the interface apparatus 203 or, if users may access a common data bus, from the data transmission subsystem 1 to the users directly. The collecting storage device 202 may be connected to the common data bus connecting, as shown in FIG. 1, the data transmission subsystem 1 and the apparatuses 201,202,203 or, for example, connecting the apparatuses 201, 202,203 only or the data transmission subsystem 1 and the apparatuses 201,202 only (the last two variants are not shown by FIGURE). An object of the video monitoring apparatus 45 and the video data collecting and transmitting apparatus 201 in the configuration shown in FIG. 1 may be to control the availability of the entire video data in the collecting storage device 202 and the output of the missed video data from the local storage device 47. Further, the video data collecting and transmitting apparatus may be used to transmit video data to the users by-passing the interface apparatus.

In one embodiment of the invention the video monitoring apparatus or some of its modules, for example, the data transmission module, may be disposed in the body of the video camera and then the data transmission subsystem may be connected to the modules of the video monitoring apparatus disposed in the video camera. In this case the module of the video monitoring apparatus responsible for receipt the video data from the video camera and their transmission to the local storage device may be disposed either in the body of the video camera or in the body of the local storage device. At the same time the video monitoring apparatus or a part of its modules may be disposed in the local storage device, for example, in its body.

The described embodiments are not intended to limit the present invention and are outlined in order to demonstrate possible examples of the implementation of the video transmitting system in accordance with the present invention. The presented embodiments may be combined in full or in part, for example, all variants of system component configurations shown in FIG. 1 may be contemporary realized in one video transmitting system. In addition, while the specification describes capturing, storing, retrieving and transmission of the video data, those skilled in the art understand that the same operations may be simultaneously and preferably performed with regard to the audio data accompanying the said video data. At the same time the described operations may be performed with regard to the video data without the accompanying audio data.

The invention claimed is:

1. A video transmitting system including:
   a plurality of video cameras;
   a plurality of video monitoring apparatuses;
   a plurality of local storage devices;
   a data transmission subsystem;
   at least one video data collecting and transmitting apparatus;
   at least one collecting storage device; and
   at least one interface apparatus;
   wherein the video cameras are arranged to transmit video data to the local storage devices directly or through the video monitoring apparatuses,
   wherein the local storage devices are arranged to store at least a part of the video data received from the video cameras directly or through the video monitoring apparatuses,
   wherein the data transmission subsystem is arranged to receive at least a part of the video data from the video monitoring apparatuses and/or the local storage devices directly or through the video monitoring apparatuses and to transmit at least a part of the video data to the collecting storage device and/or the interface apparatus directly or through the video data collecting and transmitting apparatus,
   wherein the collecting storage device is arranged to store at least a part of the video data received from the data transmission subsystem directly or through the video data collecting and transmitting apparatus,
   wherein the interface apparatus is arranged to enable at least one user to specify a video camera and/or a video monitoring apparatus and/or a local storage device to view video data from them, and/or video data required to be viewed,
   wherein the video data collecting and transmitting apparatus and/or the interface apparatus are arranged to receive at least a part of the video data specified by the user from the data transmission subsystem and/or the collecting storage device and to transmit at least a part of the video data specified by the user to the user.

2. The system of claim 1, wherein the video monitoring apparatuses are arranged to receive at least a part of the video data from the video cameras and/or the local storage devices and to transmit at least a part of the video data to the data transmission subsystem.

3. The system of claim 1, wherein the video data collecting and transmitting apparatus is arranged to receive at least a part of the video data specified by the user from the data transmission subsystem and/or the collecting storage device and to transmit at least a part of the video data specified by the user to the user directly or through the interface apparatus.

4. The system of claim 1, wherein the video cameras and/or the video monitoring apparatuses are arranged to assign the identification information of the video monitoring apparatus and/or the video camera and/or the local storage device to at least a part of the video data, wherein the video monitoring apparatuses are arranged to transmit at least a part of the video data jointly with the identification information of the video monitoring apparatus and/or the video camera and/or the local storage device.

5. The system of claim 1, wherein the video monitoring apparatuses and/or the video data collecting and transmitting apparatus are arranged to process the video data, wherein the video data processing is compression and/or encoding and/or format conversion and/or allocation of a part of the video data to be transmitted.

6. A video monitoring apparatus in a video transmitting system including video cameras, local storage devices, a data transmission subsystem, at least one video data collecting and transmitting apparatus, at least one collecting storage device, and at least one interface apparatus,
   wherein the video monitoring apparatus is connectable to at least one video camera, at least one local storage device, and the data transmission subsystem,
   wherein the video monitoring apparatus is arranged to receive video data from the video camera and to store at least a part of the video data received from the video camera in the local storage device and/or arranged to receive the video data from the local storage device, and is arranged to transmit at least a part of the video data received from the video camera and/or the local storage device to the data transmission subsystem to transmit them to the video data collecting and transmitting apparatus and/or the collecting storage device and/or the interface apparatus.

7. The apparatus of claim 6, wherein the video monitoring apparatus is arranged to assign identification information of the video monitoring apparatus and/or the video camera and/or the local storage device to at least a part of the video data, wherein the video monitoring apparatus is arranged to transmit at least a part of the video data jointly with the identification information of the video monitoring apparatus and/or the video camera and/or the local storage device.

8. The apparatus of claim 6, wherein the video monitoring apparatus is arranged to process the video data, wherein the video data processing is compression and/or encoding and/or format conversion and/or allocation of a part of the video data to be transmitted.

9. The apparatus of claim 6, wherein the video monitoring apparatus is arranged to compress the video data and to transmit at least a part of the compressed video data to the local storage device and/or the data transmission subsystem.

10. A video data collecting and transmitting apparatus in a video transmitting system including video cameras, video monitoring apparatuses, local storage devices, a data transmission subsystem, at least one collecting storage device, and at least one interface apparatus,
    wherein the video data collecting and transmitting apparatus is arranged to collect and transmit video data from the plurality of the video cameras and/or the video monitoring apparatuses and/or the local storage devices installed at geographically distributed locations,
    wherein the video data collecting and transmitting apparatus is connectable to the data transmission subsystem, the collecting storage device, and the interface apparatus,
    wherein the video data collecting and transmitting apparatus is arranged to receive the video data from the data transmission subsystem and to store at least a part of the received video data in at least one collecting storage device, wherein the video data collecting and transmitting apparatus is arranged to receive information on a specified by a user video camera and/or a video monitoring apparatus and/or a local storage device to view video data from them and/or video data specified by the user and required to be viewed from the interface apparatus and is arranged to receive at least a part of the specified video data from the data transmission subsystem and/or the collecting storage device and to transmit at least a part of the specified video data to the user directly or through the interface apparatus.

11. The apparatus of claim 10, wherein the video data collecting and transmitting apparatus is arranged to process the video data, wherein the video data processing is compression and/or encoding and/or format conversion and/or allocation of a part of the video data to be transmitted.

12. An interface apparatus of a video transmitting system including video cameras, video monitoring apparatuses, local storage devices, a data transmission subsystem, at least one video data collecting and transmitting apparatus, and at least one collecting storage device,
- wherein the interface apparatus is connectable to the data transmission subsystem and/or the video data collecting and transmitting apparatus and/or the collecting storage device,
- wherein the interface apparatus is arranged to enable at least one user to specify a video camera and/or a video monitoring apparatus and/or a local storage device to view video data from them and/or video data required to be viewed,
- wherein the interface apparatus is arranged to receive at least a part of the specified video data from the data transmission subsystem and/or the video data collecting and transmitting apparatus and/or the collecting storage device and to transmit at least a part of the specified video data to the user.

* * * * *